(12) United States Patent
Tripathi

(10) Patent No.: US 7,283,843 B2
(45) Date of Patent: Oct. 16, 2007

(54) SYSTEMS AND METHODS FOR RECEIVER UPGRADE

(75) Inventor: Ashok Burton Tripathi, Santa Barbara, CA (US)

(73) Assignee: Superconductor Technologies, Inc., Santa Barbara, CA (US)

( * ) Notice: Subject to any disclaimer, the term of this patent is extended or adjusted under 35 U.S.C. 154(b) by 394 days.

(21) Appl. No.: 10/803,969

(22) Filed: Mar. 19, 2004

(65) Prior Publication Data

US 2005/0208974 A1  Sep. 22, 2005

(51) Int. Cl.
*H04M 1/00* (2006.01)
*H04B 1/38* (2006.01)

(52) U.S. Cl. .............. 455/561; 455/560; 455/562.1

(58) Field of Classification Search ............... 455/561, 455/562.1, 73, 560, 130, 140, 550.1; 330/256; 62/51.1, 6

See application file for complete search history.

(56) References Cited

U.S. PATENT DOCUMENTS

| | | | |
|---|---|---|---|
| 5,488,382 A | 1/1996 | Fenzi et al. ............. 343/700 R |
| 5,616,538 A | 4/1997 | Hey-Shipton et al. ...... 505/210 |
| 5,886,986 A * | 3/1999 | Lee et al. .................. 370/276 |
| 6,104,934 A * | 8/2000 | Patton et al. ............... 455/561 |
| 6,205,340 B1* | 3/2001 | Yandrofski et al. ......... 455/561 |
| 6,208,221 B1* | 3/2001 | Pelz et al. .................. 333/126 |
| 6,212,404 B1* | 4/2001 | Hershtig .................... 455/561 |
| 6,263,215 B1* | 7/2001 | Patton et al. ............... 455/561 |
| 6,424,846 B1 | 7/2002 | Cortes et al. .............. 505/210 |
| 6,462,949 B1* | 10/2002 | Parish et al. ................ 361/699 |
| 6,584,303 B1* | 6/2003 | Kingswood et al. ......... 455/73 |
| 6,686,811 B2 | 2/2004 | Hey-Shipton ............. 333/99 S |
| 6,711,912 B2* | 3/2004 | Laubacher et al. ........ 62/259.2 |
| 2002/0119805 A1* | 8/2002 | Smith ....................... 455/561 |
| 2002/0151331 A1* | 10/2002 | Abdelmonern et al. ..... 455/561 |
| 2002/0173341 A1* | 11/2002 | Abdelmonern et al. ..... 455/561 |
| 2002/0173343 A1* | 11/2002 | Narahashi et al. .......... 455/562 |
| 2004/0005871 A1* | 1/2004 | Saito et al. ................. 455/287 |
| 2004/0162042 A1* | 8/2004 | Chen et al. ................. 455/130 |
| 2005/0026588 A1* | 2/2005 | Eddy et al. ................. 455/307 |
| 2005/0176387 A1* | 8/2005 | Taylor ....................... 455/117 |

\* cited by examiner

*Primary Examiner*—Sonny Trinh
(74) *Attorney, Agent, or Firm*—Wolff Law Offices, PLLC; Kevin A. Wolff

(57) ABSTRACT

Systems and methods for an upgradeable and/or reconfigurable receiver are provided. In general, the present invention is directed to providing systems and methods for designing an electronic communication system having easy and cost effective upgradeable receiver systems and components including, for example, an amplifier and/or a filter. For example, a receiver may include a receiver front end that is configured so that at least one of the original conventional system components may be used along with one or more new system components to provide greater receiver sensitivity and/or selectivity. In various embodiments, portions of an upgradeable receiver system may be made as modular components that allow easy replacement for the upgradeable components which may include a signal amplifier and/or a signal filter. In various embodiments the receiver may be upgraded by replacing a conventional low noise amplifier (LNA) with a high temperature superconductor (HTS) filter and/or a cry-cooled LNA.

44 Claims, 8 Drawing Sheets

SYSTEMS AND METHODS FOR RECEIVER UPGRADE

BACKGROUND OF THE INVENTION

1. Field of the Invention

The present invention relates to the field of communications and, more specifically, to methods and systems for providing electronic communications.

2. Description of the Related Art

Today there are numerous types of electronic or electronic assisted communication systems that include, for example, radio, television, cable, internet, two-way radio, cellular telephone systems, LANS, WANS, and optical communication systems. Many of these systems may employ various types of signal amplifiers and filters in their receivers that have a particular performance capability to support today's use and traffic requirements. However, these electronic communication systems will likely experience increased communication information use and traffic in the future that will require better signal amplifiers and filters beyond their present capability and the systems would thus benefit from incorporating system designs and components that are easily and cost effectively upgradeable to accommodate the additional use and traffic.

For example, to provide cost effective and reliable system deployment, wireless communication service providers often utilize signal amplifiers at the receiver front end to boost received signal. This approach improves overall receiver sensitivity and radio link margin. In addition, wireless service providers often find it advantageous to use signal filtering at the receiver front end to improve channel selectivity and noise rejection, suppress cross channel interference, and maintain a high sensitivity even in the presence of out of band interference.

Presently, wireless communication operators must choose between higher cost High Temperature Superconductor (HTS) based receiver front ends and conventional filter plus Low Noise Amplifier (LNA) products. In the presence of electromagnetic interference, low noise conventional products may not provide sufficient filtering to protect the noise floor of the base station from increasing. In such cases, the conventional receiver front end systems must be replaced with better performance systems such as, for example, an HTS based system, that provide greater sensitivity, greater selectivity, or a combination thereof. However, replacing a conventional receiver front end with a receiver front end including HTS typically results in the wasteful practice of disposing of all or most of the components and housing of the conventional receiver front end.

SUMMARY

The present invention is directed generally to providing systems and methods for designing an electronic communication system having easy and cost effective upgradeable receiver system and components including, for example, an amplifier and/or a filter. For example, a receiver may include a receiver front end that may be configured so that at least one or more of the original conventional system components may be used along with one or more new system components to provide greater receiver sensitivity and/or selectivity. In various embodiments, portions of an upgradeable receiver system may be made as modular components that allow easy replacement for the upgradeable components which may include a signal amplifier and/or a signal filter. In various embodiments the receiver may be upgraded by replacing a conventional low noise amplifier (LNA) with a high temperature superconductor (HTS) filter and/or a cryo-cooled LNA.

More specifically, the system may be initially constructed so that a receiver front end includes a duplexer module (e.g., a single duplexer, a dual-duplexer, etc.) and an initially installed LNA powered by a power supply. Then, when improved signal sensitivity and/or selectivity is needed, the receiver front end may be upgraded by removing the initial power supply and/or the initial LNA and coupling a new higher performance module or sub-system to the duplexer. The new higher performance module or sub-system may include, for example, a HTS filter and/or a cryo-cooled LNA. The upgraded system may also include a cooling system, a control board, a heat sink, and/or a power supply. In one embodiment, all of the newer higher performance module or sub-system may be mounted on a panel as a single assembly.

In various embodiments of the present invention, the system may include an enclosure which is configured to permit a user to upgrade from a first set of receiver front end components to a second set of front end components. The first set of components may include at least a conventional amplifier, while the second set of components may include cryogenically based HTS filtering and low-noise amplification. In at least one embodiment, the upgradeable front end may be a component of a wireless base station.

Furthermore, the design of the receiver front end chassis may be modular so that minimal modifications are required to accomplish the upgrade. Thus, a user of the system, such as, for example, a wireless service provider, can preserve the capital investment in the current system and reuse a portion of the receiver front end components already purchased. For example, a modular panel such as, for example, a rear panel, may be provided to allow simple replacement of the conventional amplifier or amplifiers and the power supply and/or alarm circuit board on a first modular panel with a heat sink that has HTS and cryogenic equipment such as, for example, a HTS filter and cryo-cooled amplifier, pre-mounted on a second modular panel to accomplish the upgrade.

BRIEF DESCRIPTION OF THE DRAWINGS

The utility, objects, features and advantages of the invention will be readily appreciated and understood from consideration of the following detailed description of the embodiments of this invention, when taken with the accompanying drawings, in which same numbered elements are identical and.

DESCRIPTION OF THE PREFERRED EMBODIMENTS

In general, the present invention is directed generally to providing systems and methods for designing an electronic communication system having easy and cost effective upgradeable receiver system and components that may include, for example, a signal amplifier and/or signal filter. More particularly, the present invention relates to systems and methods that may include a receiver front-end for wireless base stations that can be upgraded to include high temperature superconductor based filtering and/or a cryogenically cooled low noise amplifier. For example, a receiver may include a receiver front end that may be configured so that at least one or more of the original conventional system components may be used along with one or more new system components to provide greater receiver sensitivity and/or selectivity.

In one embodiment, the invention may provide for conventional low-noise amplification of duplexed or simplexed RF communication signals configured so that the device may be upgraded at a later date to provide superconductor based filtering and/or cryogenic low noise amplification to the signals. The device is designed to reuse one or more of the original conventional internal components and minimize the cost of the upgrade. In one embodiment, a housing having sufficient space to accommodate the upgrade components may be used as the housing to accommodated conventional LNA and where needed conventional duplexing components. In one variation, the housing may include use of a conventional LNA coupled to a dual-duplexer for uplink enhancement without band specific filtering. In this case, the packaging may be designed so as to allow for eventual upgrade to, for example, a superconducting product which will provide sharp interference filtering and very low insertion loss.

Conceptually, a dual duplexed upgradeable receiver front end may use, for example, dual-duplexers, some cabling, chassis, and all enclosure hardware typically include in present superconductor receiver front end products. Various parts to be utilized to conform the typical present superconductor receiver front end product to a conventional receiver front end for initial system installation may include, for example, one LNA per channel, a circuit board assembly with power supply and alarm functionality for each channel, some new wiring harnesses, and a rear panel onto which a power supply board is mounted so as to form a removable module. Of course, as a result of this design approach, although the initially installed receiver front end has some conventional components and signal performance, it is configured with a removable rear panel that is easily removed and extra space that enables it to be upgraded to a system that is cryo-cooled system and may include an HTS filter and/or LNA.

Figure 1:
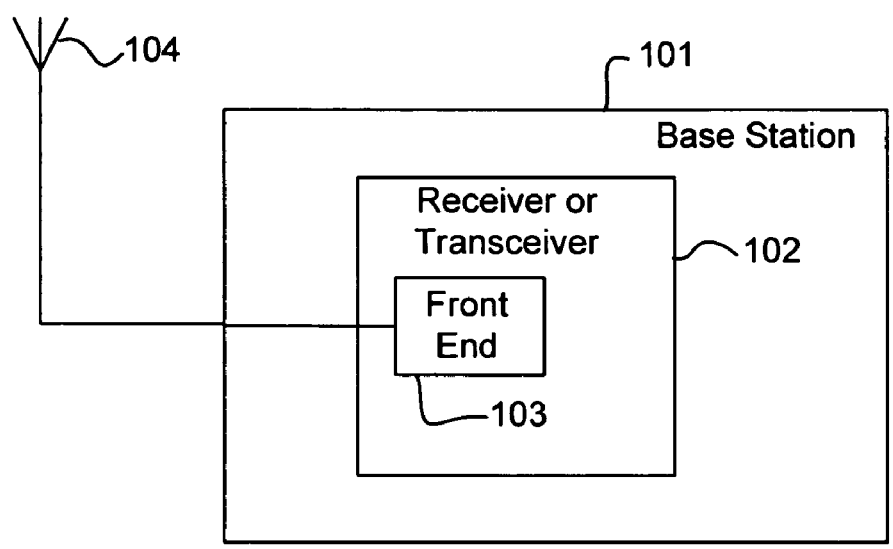
FIG. 1 is a top level system block diagram of an exemplary embodiment of a wireless communications system.

At least one embodiment may be described with respect to a wireless communication system 100 as shown in FIG. 1. Referring to FIG. 1, at least one embodiment of a wireless communication system 100 may include a base station 101. In such embodiments, the base station 101 may include a receiver or transceiver 102 having a front end portion 103 and an antenna 104. Although, the front end 103 does not necessarily need to be collocated with other portions of the base station 101 electronics, and may be in various embodiments housed separately. In any case, the front end 103 may include components for conditioning the electrical characteristics of the received signal and/or transmitted signal. The received signal may be, for example, a Radio Frequency (RF) signal. For example, the received signal may be a cellular signal, Personal Communications Services (PCS) signal, GSM signal or 3G signal having frequency ranges of, for example, 824-849 MHz, 850-870 MHz, 1750 to 1990 MHz, and 2000-2100 MHz. Of course, the invention may be equally applicable to communication systems operating at other frequencies where it is desirable to, for example, improve the sensitivity and/or selectivity for a given bandwidth.

For example, the front end 103 may include one or more signal amplifying components. Further, the front end 103 may also include one or more signal filtering components. In an embodiment, the front end 103 may include different sets of components to provide particular treatment of the received signal or transmitted signal according to predetermined signal characteristics and operating parameters desired for the receiver or transceiver 102.

Figure 2A:
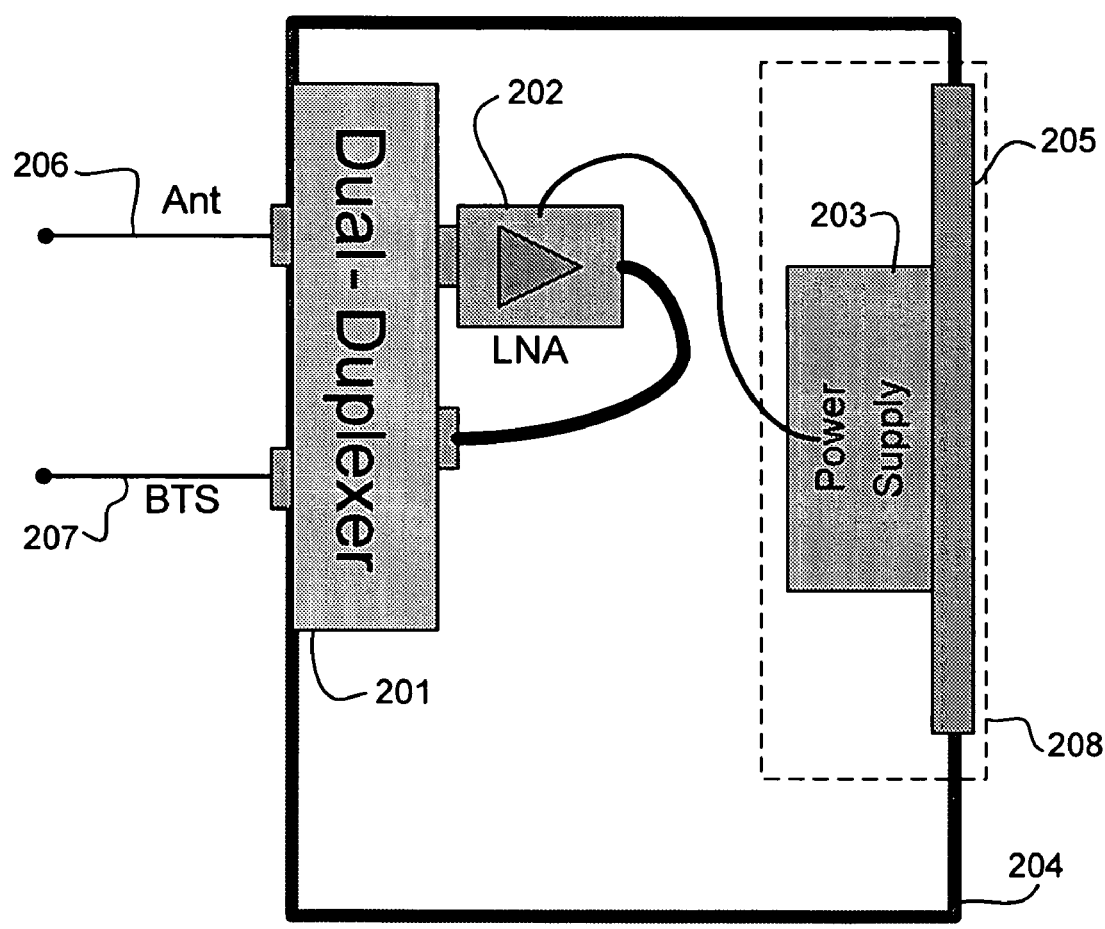
FIG. 2A is a functional block diagram of at least one exemplary embodiment including a receiver front end having a first set of components.

An exemplary first set of front end 103 components is illustrated in FIG. 2A. The front end 103 may be comprised of various modules that make upgrading the receiver more efficient. As shown in FIG. 2A, a front end 103 having a first set of components 200 may include at least one duplexer module such as dual-duplexer 201, at least one amplifier module such as amplifier 202, and at least one power supply module 208 including power supply 203 and panel 205. The front end 103 may further include a housing 204 that supports or maintains all the modules, for example, the duplexer module 201 and power supply module 208 may be attached thereto. In one embodiment, the housing 204 is used to house all of the modular components into a single package. As shown, in this embodiment, the power supply 203 may be mounted or affixed to a mounting back panel 205. However, the power supply may be mounted elsewhere but should be easily removable, as long as the back panel 205 may be removed to allow easy introduction of updated components.

The dual-duplexer 201 may include at least one terminal 206 for receiving and/or transmitting a communication signal. In at least one embodiment, the input 206 may be coupled to a signal source, such as, for example, an antenna (not shown), a cable, etc. The dual-duplexer 201 may also include a second terminal 207. The terminal 207 may be coupled to various types of communication equipment, for example, a base station or an RF receive chain for further processing of the received and/or transmitted signal. In at least one embodiment, the terminal 207 may be coupled to the downstream receiver or transceiver components of the base station 101 such as, for example, decoding or demodulation components.

The first set of components 200 may further include a signal amplifier 202 coupled to the dual-duplexer 201. The input of the amplifier 202 may be coupled to the dual-duplexer 201 such that a communication signal received by the dual-duplexer 201 via terminal 206 is presented to the input of the amplifier 202. The output of the amplifier 202 may be coupled to the dual-duplexer 201 such that the output of the amplifier 202 is presented from the dual-duplexer via terminal 207. In an embodiment, one amplifier 202 may be provided for each channel provided by the front end 103. Another embodiment may include multiple channels, for example six channels, in a single housing 204.

In at least one embodiment, the amplifier 202 may be an active component used to amplify a portion of the received signal. In particular, the amplifier 202 may be a Low Noise Amplifier (LNA) having particular electrical characteristics. For example, the LNA amplifier 202 may be designed to amplify the received signal with predetermined gain while preventing amplification of certain noise components and to not introduce appreciable additional noise from the amplifier itself or the amplification process. Several such LNA amplifier products are available and may be referred to as tower mounted amplifiers, mast head amplifiers, tower top amplifiers, or other such nomenclature. An example of such an LNA is the LNA include in the Tower Mounted Amplifier series of products provided by LGP Corporation of Plano, Tex. Another exemplary LNA may be an LNA as shown in commonly assigned U.S. Pat. No. 5,488,382.

Thus, for the front end 103 including the first set of components 200, the received signal may be received by the terminal 206 of the dual-duplexer 201, amplified by the amplifier 202, and output to additional receiver portions via the terminal 207. As previously mentioned, the receiver front end 103 may include multiple channels, for example six dual duplexed channels.

Figure 2B:
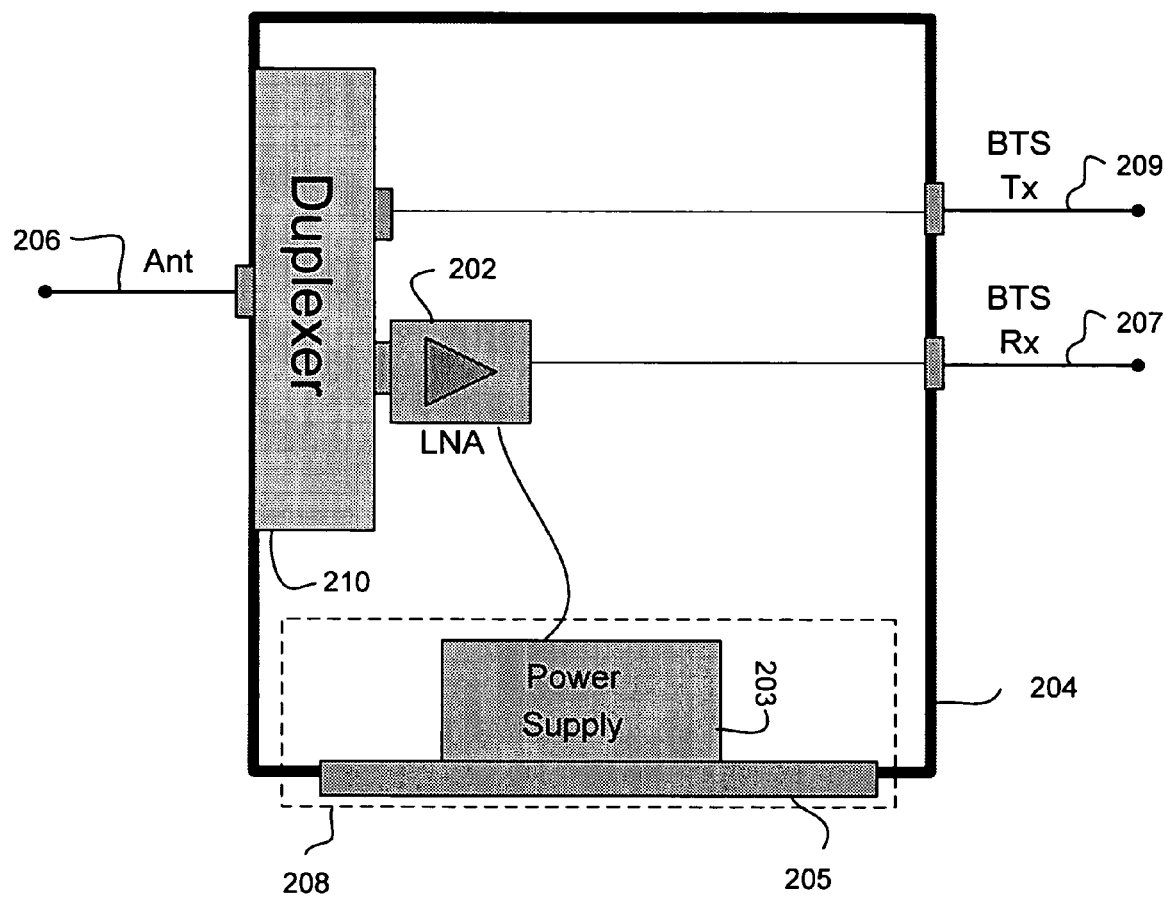
FIG. 2B is a functional block diagram of another exemplary embodiment including a receiver front end having a different first set of components.

Other embodiments are also possible. For example, the duplexer does not need to be dual ended, or the duplexer might be eliminated (i.e., a simplex configuration). FIG. 2B shows an embodiment with a duplexer 210 and an LNA 202 coupled thereto. The output of the LNA 202 may in this case be coupled to terminal 207 and output to additional receiver portions without passing through another filter. In this case an addition terminal, terminal 209 may be required. The transmit signal may be coupled to terminal 209 and directly to duplexer 210. As shown, in this embodiment the power supply 203 and mounting panel 205 may be located perpendicular to the duplexer 210, rather than parallel with dual-duplexer 201, and may thus be a floor panel. Further, embodiments may include more than six or less than six channels per front end 103.

In many systems and applications, the above described front end 103 having the first set of components 200 may provide sufficient signal conditioning to permit economical operation of the system 100. However, a service provider may find it desirable or necessary to change the operating characteristics for the front end 103. For example, in a wireless communication system as additional wireless services are deployed in a given geographic area or location, the received signal present at the input 206 may include additional noise components not previously present. In addition, the overall noise floor may also increase. The presence of additional noise may lead to a service or system provider to upgrade the base station 101 and, in particular, the receiver front end 103, to counteract the degrading effects caused by additional noise sources. In other cases, a service provider or system provider may wish to add traffic carrying capacity. In wireless telephone systems such as GSM, CDMA, etc., the provider may wish to add traffic to a particular base station so as to improve the technical and economic performance of the system. Still further, a service provider or system provider may wish to maintain the current performance of, for example, a base station but add data service, or may wish to change the channel or channels used by the base station. Each of these scenarios, as well as others, may require the service provider or system provider to upgrade or modify the predetermined electrical characteristics of the receiver or transceiver front end 103 by, for example, replacing all or a portion of the above described first set of components with a second set of components. The second set of components may or may not include one or more items, or a subset, of the first set of components. The second set of components may be selected to provide greater receiver sensitivity, greater channel selectivity, or, in at least one embodiment, a combination thereof.

Figure 3:
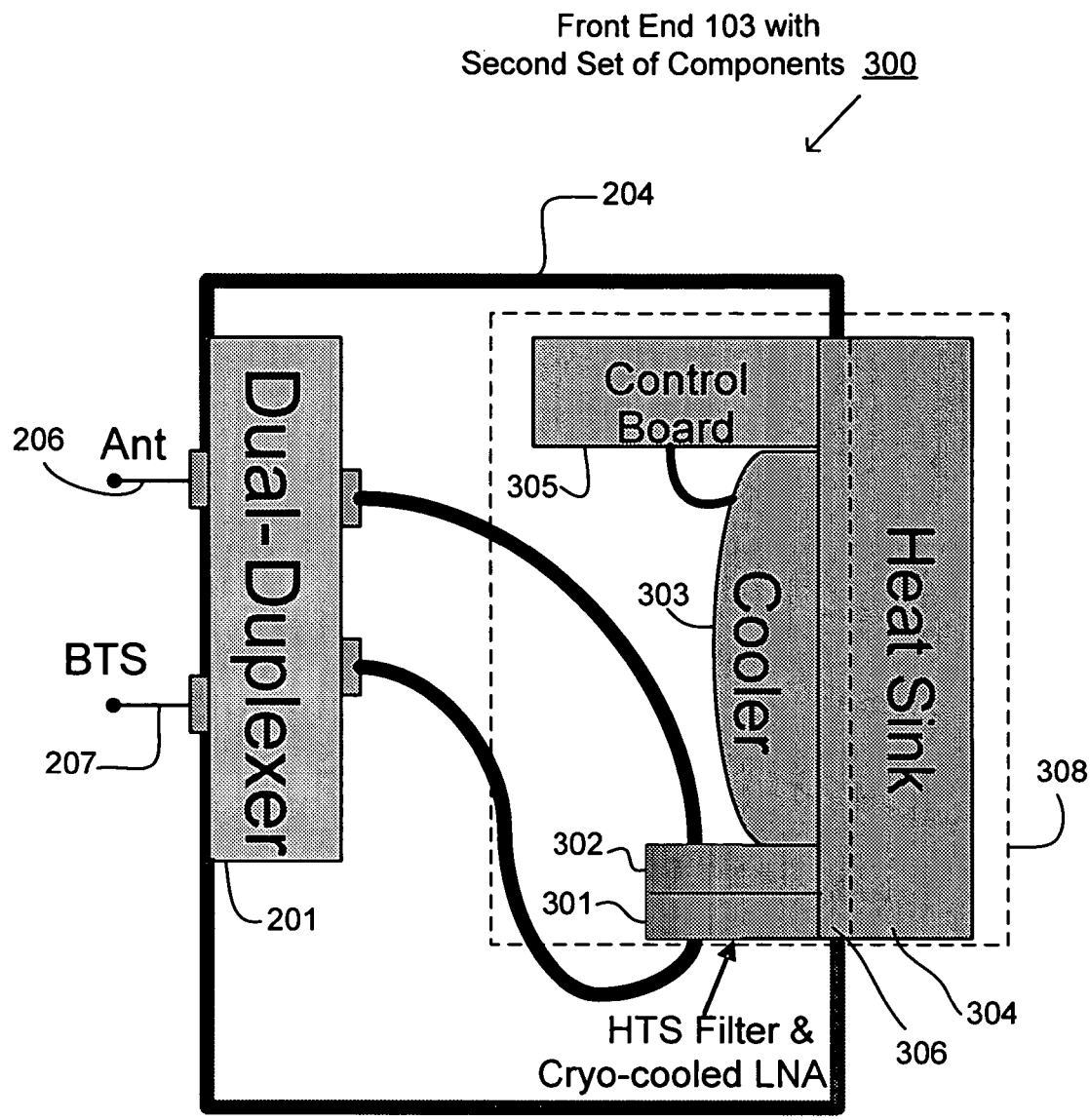
FIG. 3 is a functional block diagram of at least one exemplary embodiment including a receiver front end having a second set of components.

Accordingly, in an embodiment, the front end 103 may be modified or upgraded to include a second set of components 300, as shown in FIG. 3. Referring to FIG. 3, the second set of components 300 may be designed to provide, for example, front end 103 operation according to second predefined characteristics. Such characteristics may include, but are not limited to, amplifier gain, sensitivity, selectivity, and filtering. Sensitivity may be a measure of the ability of an amplifier to amplify the desired portion (e.g., pass band) of the received signal (e.g., gain or transfer function). Selectivity may be a measure of the roll-off rate of the frequency response of a filter, usually expressed in dB/decade.

As is generally known in the art, the amount of noise introduced into the signal output of an amplifier may be reduced by cooling the amplifier. For certain devices such as devices made of Gallium Arsenide Field Effect Transistors (GaAs FET) the reduction in added noise continues as the device is cooled even to cryogenic temperatures. An example of such a cryogenically cooled LNA is shown and described in U.S. Pat. No. 5,488,382. Such a cryogenically cooled LNA may be used to increase received signal sensitivity of the front end 103.

Filter selectivity may be increased by using a filter based on a high temperature superconductor (HTS). The superconducting properties of the HTS filter allow the band pass portion of the filter's frequency response to have a very sharp roll-off rate (i.e., high dB/decade roll-off), while very little insertion loss or noise is added to the signal, as shown and described, for example, in U.S. Pat. Nos. 5,616,538 and 6,424,846, which are hereby incorporated herein by reference for all purposes. This sharp roll-off allows the systems designer to reduce the size of the guard band between adjacent frequency channels of the system, and may also permit greater information carrying capacity in each frequency channel of the system without increasing cross channel interference. Thus, greater selectivity may afford to a service provider greater capacity, without the need for additional frequency bandwidth or additional base stations. This can significantly improve the technical and economic operation of the system.

Therefore, as shown in FIG. 3, in at least one embodiment, the second set of components 300 for the front end 103 may include a second amplifier 301 that provides a high fidelity amplified signal without introducing significant additional unwanted noise or distortion. In an embodiment, the second amplifier 301 may provide less added noise (i.e., lower Noise Figure) than the first amplifier 202 of the first set of components 200. The second amplifier 301 may be, for example, a cryogenically cooled amplifier such as that shown and described in U.S. Pat. No. 5,488,382.

Furthermore, the second set of components 300 may also include a filter 302. The filter 302 may be a bandpass filter designed to block unwanted components in the signal (e.g., signal components falling outside the pass band of the filter). In at least one embodiment, the filter 302 is a High Temperature Superconductor (HTS) based filter such as, for example, the HTS filter shown and described in U.S. Pat. Nos. 5,616,538 and 6,424,846, which are hereby incorporated herein by reference for all purposes. As shown in FIG. 3, the amplifier 301 and the HTS filter 302 may be included in the same subcomponent structure. In another embodiment the LNA may be a conventional non-cryo-cooled LNA.

In an embodiment, the second set of components 300 may further include the dual-duplexer 201, a cryogenic cooler 303, a heat sink 304, and a control board 305, and a second module mounting panel 306. A cryo-cooled system module 308 may include, for example, a cryogenic cooler 303, a heat sink 304, a control board 305, and a second module mounting panel 306. The system may also include a cry-cooled HTS filter 302 and/or an LNA 301. In one variation, the means for mounting the cryo-cooled system module together and to the housing 204, may be the heat sink 304, without the need for mounting panel 306. In this case, the control board 305, cooler 303, HTS filter 302 and/or an LNA 301 may be mounted directly to the heat sink 304 and the heat sink 304 mounted to the housing 204. Note that the second set of components 300 may include a subset of the first set of components 200 such as, for example, the dual-duplexer 201 and/or housing 204. As shown by comparing FIG. 2 and FIG. 3, an upgraded front end 103 may be achieved in this case by removing the amplifier module 202 and power supply module 208 and replacing them with the cryo-cooled system module 308, while utilizing the housing 204 and dual-duplexer from the initial front end system 103 with first set of components 200. This makes for a system that has an easy and cost effective upgrade. Other combinations of the first set of components 200 and the second set of components 300 are also possible, some of which are described below.

Figure 4:
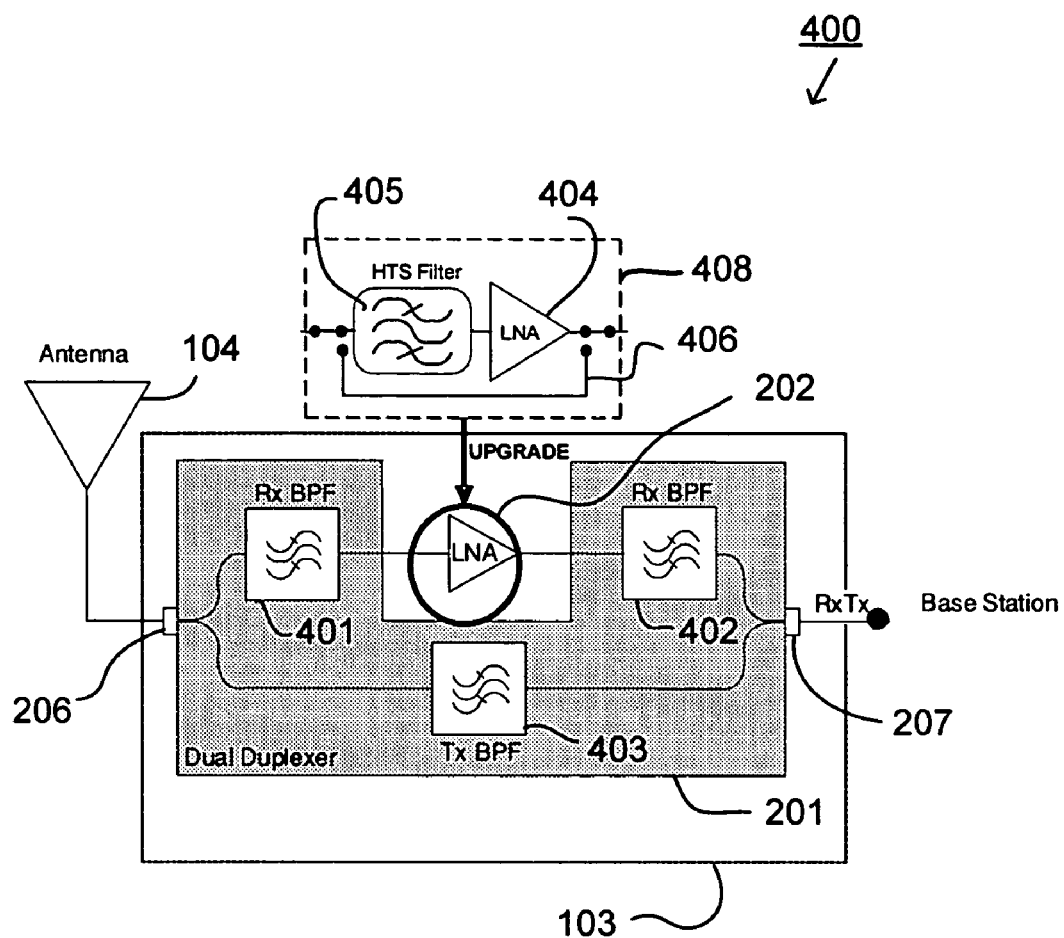
FIG. 4 is a schematic block diagram of at least one exemplary embodiment including a receiver front end having one type of first set of components.

FIG. 4 is a schematic block diagram showing the electrical signal flow of at least one embodiment 400 of the receiver or transceiver front end 103 having the first set of components 200. Referring to FIG. 4, the antenna 104 may be coupled to the dual-duplexer 201 via the terminal 206. The received signal may be presented to a first receive bandpass filter 401, the output of which may be coupled to the LNA 202. The amplified signal output from LNA 202 may then be coupled to a second receive bandpass filter 402, the output of which may be routed to downstream receiver components via the terminal 207. For outgoing signal transmission, the transmitted signal is routed to the dual-duplexer 201 from upstream transmit chain components via output 207. (For consistency, dual-duplexer terminal 206 and terminal 207 are thus described in one way for the receive direction. It should be understood that for transmit, the terminal 207 receives the transmitted signal and terminal 206 couples the transmitted signal to, for example, antenna 104 or a connection cable.) Further details regarding operation of an embodiment 400 may be found in, for example, commonly assigned U.S. Pat. No. 6,686,811, which is hereby incorporated herein by reference for all purposes.

FIG. 4 also shows one example of an upgrade replacement, having the LNA 202 of the first set of components 200 being replaced with the amplifier 404 (e.g., 301) and filter 405 (e.g., 302) of the second set of components 408. Following upgrade, the received signal output of receive bandpass filter 401 may be coupled to the input of the filter 405. The output of the filter 405 may be coupled to the input of the amplifier 404. The output of the amplifier 404 may be coupled to the receive bandpass filter 402. The filter 405 may be a bandpass filter. The filter 405 may have improved frequency response and/or a sharper roll-off than bandpass filters 401 and 402. In one embodiment, the filter 405 may be, but need not be, an HTS filter 302 and the LNA 404 may be, but need not be, a cryo-cooled LNA 301. The second set of components 408 may also include a bypass circuit 406 to maintain operation of the base station 101 in the event of a failure the HTS filter 302 or LNA 404.

Figure 5:
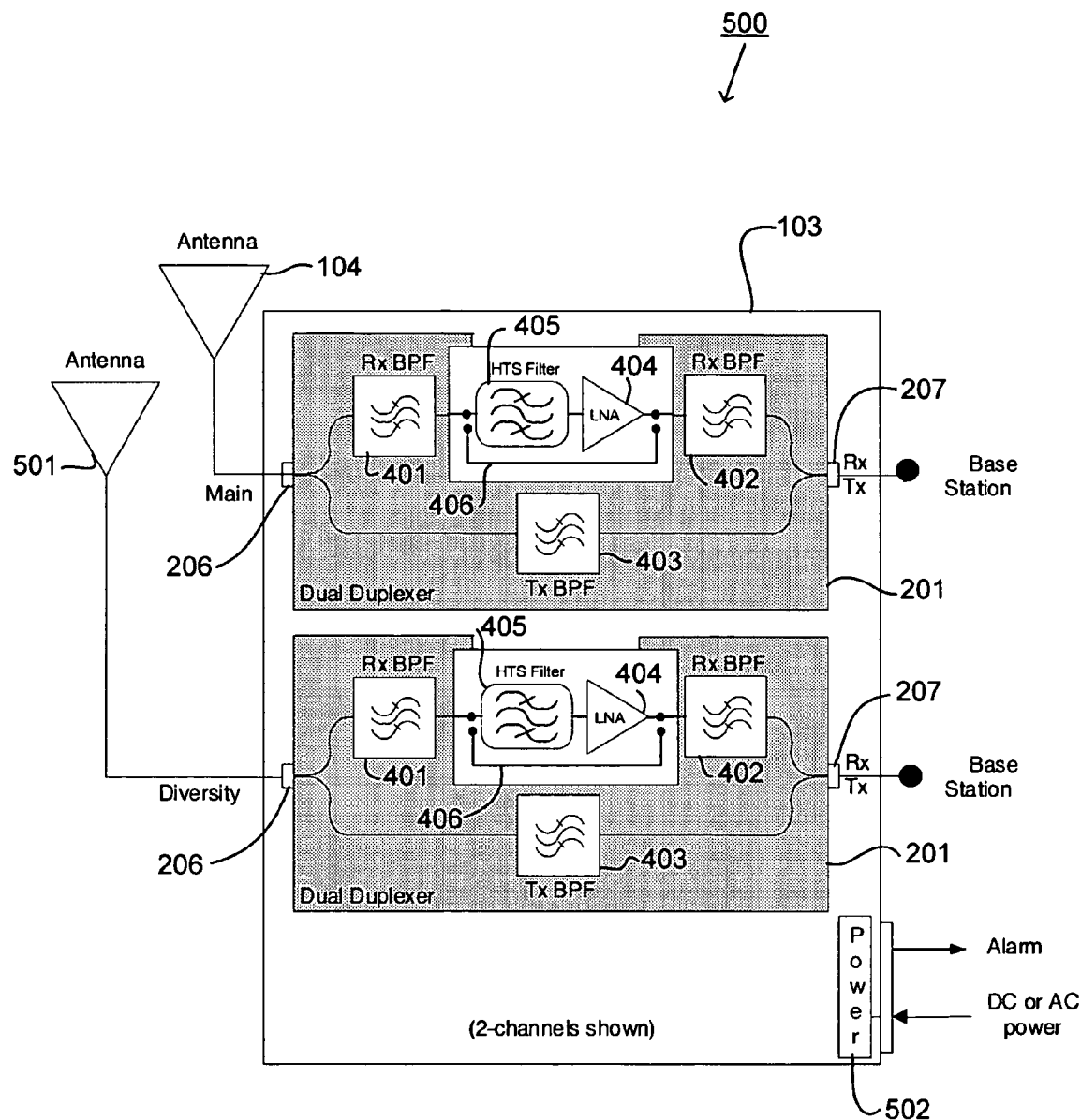
FIG. 5 is a schematic block diagram of an exemplary embodiment including a receiver front end having a second set of components and multiple channels.

FIG. 5 is a schematic block diagram of an embodiment 500 of the receiver or transceiver front end 103 having the second set of components 408 (e.g., 300) and multiple channels. For illustrative purposes, two channels are shown. However, it is to be understood that any number of channels may be provided. In at least one embodiment 500, the receiver or transceiver front end 103 may include six channels or RF paths. In an embodiment 500, the receiver front end 103 may include a second antenna 501 and/or connection cable, which may provide antenna diversity, in addition to the main antenna 104. Alternatively, three or four antennas may be provided for diversity. The receiver or transceiver front end 103 may include one or more shared power supply 502. The power supply 502 may include alarm monitoring circuits. The power supply 502 may also use redundant components in order to assure operation of the main diversity channel in the event of a failure. In other respects, an embodiment 500 may be substantially as shown and described with respect to FIG. 4.

Figure 6:
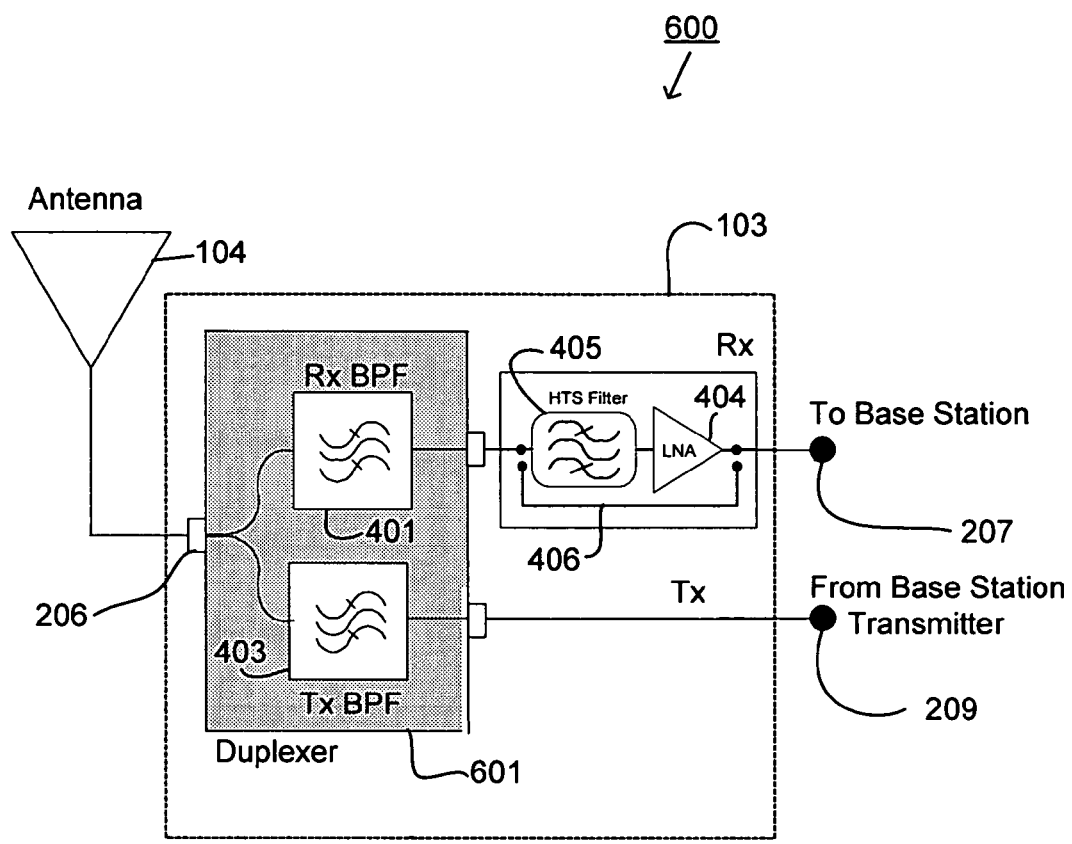
FIG. 6 is a schematic block diagram of an exemplary embodiment including a receiver front end having a second set of components and a duplexer.

Furthermore, FIG. 6 is a schematic block diagram of an embodiment 600 of the receiver or transceiver front end 103 having the second set of components 408 (e.g., 300), and a duplexer 601 instead of the dual-duplexer 201. In such an embodiment 600, the received signal output of receive bandpass filter 401 may be coupled to the input of the filter 406, and the output of the filter 406 may be coupled to the input of the amplifier 404, also substantially as shown and described with respect to FIG. 4.

The housing 204 shown in FIG. 3 may be the same housing 204 shown in FIG. 2. Thus, the housing 204 may be configured to contain receiver or transceiver front end 103 regardless of the particular set of components comprising the front end 103. For example, the housing 204 may physically and functionally accommodate the front end 103 including the first set of components 200 or the second set of components 300, or any combination thereof. In at least one embodiment, the housing 204 may have a volume of 13824 cubic inches and dimensions of twenty-four (24) inches in length, width, height. In one variation, the housing 204 may have a volume of 8064 cubic inches and dimensions of twenty-four (24) inches in width, twenty-four (24) inches in height, and fourteen (14) inches in length.

In at least one embodiment, the second amplifier 301, filter 302, cryogenic cooler 303, heat sink 304, and control board 305 may be mounted or affixed to the second mounting or modular panel 306. In an embodiment, the housing 204 may be configured to accept either the first mounting or modular panel 205 or the second mounting or modular panel 306 without structural modification. Thus, a service provider may upgrade the receiver front end 103 from the first set of components 200 to the second set of components 300 by removing the first panel 205 and replacing it with the second panel 306 populated with a subset of the second set of components 300, for example, as shown in FIG. 3. In at least one embodiment, panel 205 or panel 306 may be located at the rear, or back, of the housing 204.

The control board 305 may include logic elements for controlling the operation and maintaining the operating parameters of, for example, the amplifier 301 (e.g., 404) and the filter 302 (e.g., 405). The control board 305 may also include alarm monitoring and reporting circuits to detect and report various abnormal operating conditions of the front end 103. In at least one embodiment, the control board 305 may be implemented using a microprocessor such as, for example, an Intel Pentium® microprocessor available from Intel Corporation of Portland, Oreg. Alternatively, the control board may be implemented using a microcontroller. Alarm monitoring and reporting may be provided for each channel provided by the front end 103.

Further, an upgrade may also include removing a subset of the first set of components 200 not to be reused such as, for example, the amplifier 202, while retaining certain other items of the first set of components 200 such as, for example, the dual-duplexer 201. In addition, cabling used with the first set of components 200 may be reused with the second set of components 300.

Figure 7:
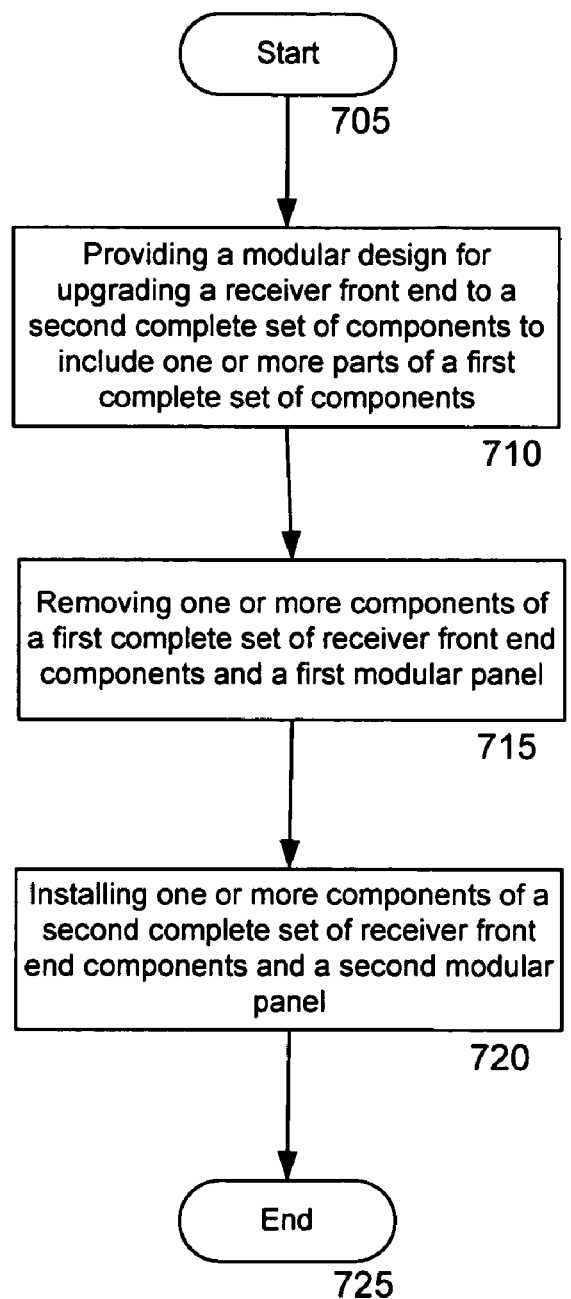
FIG. 7 is a flow chart of a method according to at least one exemplary embodiment.

A method 700 according to at least one embodiment is shown in the flow chart of FIG. 7. Referring to FIG. 7, a method 700 may commence at 705 and proceed to 710, at which a modular design may be provided for upgrading a receiver front end to a second complete set of components that includes one or more parts of a first set of components. Method 700 may then proceed to 715, at which service personnel may remove one or more components of the first complete set of receiver front end components. One or more of the first set of components may be mounted or affixed to a first mounting or modular panel.

Method 700 may then proceed to 720, at which service personnel may install one or more components of a second complete set of receiver or transceiver front end components and a second modular panel. The second complete set of components may include different components than the first set of components. Further, one or more of the different components included in the second set of components may be mounted or affixed to a second mounting or modular panel. In at least one embodiment, to accomplish an upgrade the first mounting or modular panel, which may be a removable rear panel, is removed and replaced with a second mounting or modular panel, which may be a heat sink assembly as shown in FIG. 3. The second modular panel assembly may include a new controller board, cooler, and dewar with one or more HTS filters inside, as shown in FIG. 3. The conventional LNAs may be removed and new cabling added to route the received signal from the dual-duplexers to the HTS dewar and back. New wiring harnesses may be installed to route power and alarm functionality as required. Method 700 may then proceed to 725, at which a method may end.

Thus, the system and method of the embodiments described herein may provide a means by which a service provider may protect their capital equipment investment against latent or newly appearing electromagnetic interference that would otherwise adversely affect receiver performance. Capital equipment investment may be preserved because service providers may make use of some or nearly all the hardware already purchased for the first set of front end components. For example, in one case the enclosure or housing, seals, dual-duplexers, and some wiring may be reused during the upgrade to HTS.

While embodiments of the invention have been described above, it is evident that many alternatives, modifications and variations will be apparent to those skilled in the art. Accordingly, the embodiments of the invention, as set forth above, are intended to be illustrative, and should not be construed as limitations on the scope of the invention. Various changes may be made without departing from the spirit and scope of the invention. Accordingly, the scope of the present invention should be determined not by the embodiments illustrated above, but by the claims appended hereto and their legal equivalents.

I claim:

1. A wireless communication system comprising:
a receiver front end having a first set of components including a housing and configured so that the receiver front end may be upgraded to a second set of components also including the housing, the housing is a single enclosure for housing the receiver front end components, wherein the housing has three dimensions of sufficient size to accommodate at least a portion of the first set of components and all of the additional components added that make up the second set of components, and wherein the second set of components includes one or more cryogenically cooled components that are cooled to an HTS operating temperature(s).

2. The wireless communication system of claim 1, wherein the second set of components are mounted to the housing and includes at least one other component of the first set of components.

3. The wireless communication system of claim 1, wherein the housing accommodates only the first set of components and the second set of components.

4. The wireless communication system of claim 3, wherein the one or more cryogenically cooled components includes at least one cryogenically cooled amplifier.

5. The wireless communication system of claim 4, wherein the cryogenically cooled amplifier is a low noise amplifier.

6. The wireless communication system of claim 1, wherein the second set of components includes a cryogenic cooler, a heat sink, and a control board.

7. The wireless communication system of claim 1, wherein the second set of components includes one or more high temperature superconductor (HTS) components.

8. The wireless communication system of claim 7, wherein the one or more high temperature superconductor components includes at least one high temperature superconductor filter.

9. The wireless communication system of claim 1, wherein the second set of components includes at least one cryogenically cooled amplifier and at least one high temperature superconductor filter.

10. The wireless communication system of claim 1, wherein the second set of components includes a subset of the first set of components.

11. The wireless communication system of claim 10, in which the first set of components and the second set of components include a dual duplexer configured to provide one or more duplexed channels.

12. The wireless communication system of claim 11, in which the number of duplexed channels is six and the second set of components includes a high temperature superconductor cooled to an HTS operating temperature(s).

13. The wireless communication system of claim 1, further comprising a base station wherein the receiver front end is a component coupled to the base station.

14. The wireless communication system of claim 1, wherein the housing is a single enclosure only large enough to house receiver front end components including dual duplexers for up to three channels of a cellular telephone base station transmitter.

15. A base station system, comprising:
a receiver having an upgradeable front end including a housing, the front end including a first component that operates at a first predetermined characteristic and configured so that the front end may further include one or more second components housed by the same housing used for the first component, the second component(s) operating at a second predetermined characteristic and including one or more high temperature superconductor components that is cooled to an HTS operating temperature(s), wherein the housing for the receiver front end is a single housing having at least three dimensions of sufficient size so as to contain at least a portion of the first component and one or more of the second component, and the base station is a component of a wireless communication system.

16. The base station system of claim 15, wherein the first component is a low noise amplifier.

17. The base station system of claim 15, wherein the one or more second components includes a plurality of components mounted to the housing.

18. The base station system of claim 17, wherein the second component includes one or more cryogenically cooled components.

19. The base station system of claim 18, wherein the one or more cryogenically cooled components includes at least one cryogenically cooled amplifier.

20. The base station system of claim 19, wherein the cryogenically cooled amplifier is a low noise amplifier.

21. The base station system of claim 15, wherein the second component is further configured to provide greater channel selectivity than the first component.

22. The base station system of claim 21, wherein wherein the housing accommodates only the first set of components and the second set of components.

23. The base station system of claim 22, wherein the one or more high temperature superconductor components includes at least one high temperature superconductor filter.

24. The base station system of claim 15, wherein the second component includes a subset of the first component.

25. The base station system of claim 24, in which the first component and the second component includes a dual duplexer configured to provide one or more duplexed channels.

26. The base station system of claim 25, in which the number of duplexed channels is six and wherein the second component is cooled to a temperature equal to or below the maximum upper limit for high temperature superconductors.

27. The base station system of claim 15, wherein the housing for the receiver front end is a single housing only large enough to house receiver front end components including dual duplexers for up to three channels of a cellular telephone base station transmitter.

28. The system of claim 15, wherein the housing includes two or more other housings integrated into a single housing enclosure that houses all components.

29. A receiver or transceiver front end, comprising:
a single housing configured to accommodate a first complete set of front end signal components that require a first volume of the housing, the housing oversized relative to the area needed to accommodate the first complete set of front end signal components so as to provide an additional volume for allowing the receiver front end to be upgraded to have a second complete set of receiver front end signal components, wherein the one or more high temperature superconductor components includes at least one high temperature superconductor filter cooled to an HTS operating temperature(s) and the single housing accommodates only the first set of components and the second set of components.

30. The front end of claim 29, wherein the second set of components is configured to provide greater received signal sensitivity than the first set of components.

31. The front end of claim 30, wherein the second set of components includes one or more cryogenically cooled components.

32. The front end of claim 31, wherein the one or more cryogenically cooled components includes at least one cryogenically cooled amplifier.

33. The front end of claim 32, wherein the cryogenically cooled amplifier is a low noise amplifier.

34. The front end of claim 33, wherein the second set of components is configured to provide greater channel selectivity than the first set of components.

35. The front end of claim 34, wherein the second set of components includes one or more high temperature superconductor components.

36. The front end of claim 35, wherein the second complete set of front end signal components is larger in size than a subset of the first complete set of front end signal components.

37. The front end of claim 29, wherein the second set of components includes a subset of the first set of components.

38. The front end of claim 29, wherein a total volume of the housing is approximately equal to or greater than 8064 cubic inches.

39. The front end of claim 29, wherein the housing is three dimensional and at least two of three dimensions of the housing is approximately equal to or greater than 24 inches.

40. A method for upgrading a receiver or transceiver front end, comprising the step of:
providing a modular design so that one or more parts of a first complete receiver front end system may be used as parts of a second complete receiver front end system within the same housing, wherein the housing is a single enclosure for housing a first set of receiver front end components, wherein the housing has three dimensions of sufficient size to accommodate at least a portion of the first set of components and all of the additional components added that make up a second set of components included in the second complete receiver front end system, and wherein the second set of components includes one or more cryogenically cooled components that are cooled to an HTS operating temperature(s).

41. The method for upgrading a receiver or transceiver front end of claim 40, further comprising the steps of:
removing one or more parts of the first complete receiver front end system from the housing; and
installing one or more different parts to the housing so as to create the second complete receiver front end system.

42. A method of upgrading a receiver or transceiver front end, comprising the step of:
providing a pre-upgraded front end including a plurality of functional modules, wherein said plurality of modules includes an enlarged single housing for housing all of the other modules and having an excess area of sufficient size to house all upgrade components, the single housing having three dimensions of sufficient size to accommodate at least a portion of the plurality of function modules and all of the additional modules added for upgrading, the plurality of function modules including a duplexer module, an amplifier module including a non-cryocooled low noise amplifier, and a power supply module.

43. The method of claim 42, further comprising the steps of:
removing the power supply module;
removing the amplifier module;

adding a cryo-cooled system module that cools to an HTS operating temperature(s), wherein at least a portion of the cryo-cooled module is housed within the enlarged housing.

44. The method of claim 43, wherein the cryo-cooled system module is added by adding a cryogenically cooled high temperature superconductor filter, adding a cryogenically cooled amplifier, adding a cooler unit, adding a heat sink, and adding a control board.

* * * * *